UNITED STATES PATENT OFFICE.

ARTHUR WILLIAM HEYMAN, OF NORTHAMPTON, PENNSYLVANIA.

PROCESS FOR THE SIMULTANEOUS PRODUCTION OF SOLUBLE ALKALI COMPOUNDS AND CEMENT-MAKING MATERIALS.

1,160,172. Specification of Letters Patent. Patented Nov. 16, 1915.

No Drawing. Application filed March 21, 1912. Serial No. 685,384.

*To all whom it may concern:*

Be it known that I, ARTHUR W. HEYMAN, a citizen of the United States, and a resident of Northampton, in the county of Northampton and State of Pennsylvania, have made certain new and useful Improvements in Processes for the Simultaneous Production of Soluble Alkali Compounds and Cement-Making Materials, of which the following is a specification.

My invention relates to the simultaneous production of soluble alkali compounds and cement making material from rocks, earths, and minerals containing insoluble alkali compounds. As examples of such substances I may cite felspar, granite, slate, mica, shale, clay, and other substances in which the alkali exists in an insoluble condition.

An object of my invention is to provide a simple process for the simultaneous production of soluble alkali compounds, and of alkali free, hydraulic, cement making material.

Other objects and advantages will appear in the following specification, and the novel features of the invention will be particularly pointed out in the appended claims.

Certain of the steps of the present invention are set forth in a prior application, filed April 17, 1909, Serial No. 409,572. The present application is an improvement on the application above mentioned.

In carrying out my invention I proceed as follows: If the substance to be treated is of a silicious or argillaceous nature, such as felspar, granite, etc., containing little or no calcareous material, I grind it to a fine powder, and intimately mix therewith finely ground limestone, marl, or other calcareous material. I may mix the above coarse materials and grind them together. The amount of calcareous material to be added is variable and depends largely upon the chemical composition of the material to be treated. Furthermore, some rocks, earth and minerals contain in themselves sufficient calcareous material, or alkaline earth compounds, and therefore do not require any further addition. If the material to be treated has in itself sufficient calcareous material, or alkaline earth compounds, then the preliminary grinding and mixing may be omitted. The mixture, either natural or artificial, of silicious, or argillaceous and calcareous materials, is then heated in a suitable kiln or furnace to a red heat, or higher.

The temperature preferably employed should be from 900° to 1600° C., although it is to be understood that I do not limit myself to these temperatures. Too low a heat is to be avoided because of the lack of sufficient chemical action. Too high a heat is also to be avoided because of the volatility of the alkali, especially the potassium compounds. In this connection, I wish to state that I am aware that it has been proposed to heat a mixture of argillaceous material, lime, and chlorids, but the addition of the chlorids would defeat the purpose of my invention, since the presence of the latter renders the alkali compounds more volatile, especially the potassium compounds, so that the latter to a considerable extent are driven off during the calcination. The alkali is now in a soluble state, and may be lixiviated or leached out. In the former application #490,572 referred to above, the hydroxid constituted the principal product. Instead of the hydroxid however, I may obtain the alkali in other soluble forms. Thus the solution may be converted to the carbonate, sulfate, or nitrate, and evaporated to obtain the salt. I can, however, obtain such compounds simultaneously with the lixiviation. For example, by passing carbon dioxid gas into the water while the calcined product is being lixiviated I obtain the alkali carbonate, or bi-carbonate. By using calcium chlorid, or other soluble alkali earth compounds in the lixiviation water, I obtain alkali chlorids, or other soluble salts, the alkali earth being precipitated as hydroxid,—partially if calcium,—completely if magnesium salts are used. If carbon dioxid gas is also used, then any alkali earth is practically all precipitated as the carbonate if not used in excess. Magnesium salts are preferably not used in any great quantity, as magnesia is considered deleterious in the cement.

The residue remaining after the extraction may be again calcined and ground, making hydraulic cement. In some cases it may be necessary to add calcareous or argillaceous material, but ordinarily these materials are proportioned before the calcination of the raw materials.

In the employment of my process two important results are achieved. In the first place a cement making material is produced which is free from alkali. The product is therefore a better one and makes a more salable cement than that which is produced in the ordinary process, wherein the alkali still remains in the completed product, to its detriment. In the second place, a valuable product of soluble alkali is obtained, the sale of which greatly reduces the cost of producing the cement.

The process described above, as has been shown, is applicable to substances either natural or artificial of silicious or argillaceous nature.

In the appended claims I make use of the term "siliciferous," but it will be understood that this term is designed to be used in a generic sense in lieu of a better term, and to include any natural or artificial substances of a similar nature which contain insoluble alkali, from which cement making material can be made by the process described above.

I claim:

1. The herein described process of simultaneously producing soluble alkali compounds and cement making material from siliciferous rocks, earths, or minerals containing calcareous material and insoluble alkali, which consists in heating said rocks, earths, or minerals, the heated material being substantially free from chlorids and lixiviating said heated product with water, thereby dissolving the alkali compounds and leaving an insoluble residue of cement making material.

2. The herein described process of simultaneously producing soluble alkali compounds and cement making material from siliciferous rocks, earths, or minerals containing calcareous material and insoluble alkali, which consists in heating said rocks, earths, or minerals to a temperature above red heat, the heated material being free from chlorids, and lixiviating said heated product with water, thereby dissolving the alkali compounds and leaving an insoluble residue of cement making material.

3. The herein described process of simultaneously producing soluble alkali compounds and cement making material from siliciferous rocks, earths, or minerals containing insoluble alkali, which consists in adding to said rocks, earths, or minerals calcareous material, the mixture being free from chlorid, heating the mixture, and lixiviating said heated product with water, thereby dissolving the alkali compounds and leaving a soluble residue of cement making material.

4. The herein described process of simultaneously producing soluble alkali compounds and cement making material from siliciferous rocks, earths, or minerals containing insoluble alkali, which consists in heating said rocks, earths or minerals in the presence of calcareous material, the heated material being substantially free from chlorids, lixiviating the heated product with water, and passing carbon dioxid gas into the water during said lixiviation.

ARTHUR WILLIAM HEYMAN.

Witnesses:
SAMUEL R. SMITH,
DAVID J. NAGLE.